US012188134B2

(12) United States Patent
Viswanathan et al.

(10) Patent No.: US 12,188,134 B2
(45) Date of Patent: Jan. 7, 2025

(54) IONIC LIQUID BASED MATERIALS AND CATALYSTS FOR HYDROGEN RELEASE

(71) Applicants: CARNEGIE MELLON UNIVERSITY, Pittsburgh, PA (US); Massachusetts Institute of Technology, Cambridge, MA (US)

(72) Inventors: Venkatasubramanian Viswanathan, Pittsburgh, PA (US); Dilip Krishnamurthy, Pittsburgh, PA (US); Karthish Manthiram, Cambridge, MA (US); Zachary Schiffer, Cambridge, MA (US)

(73) Assignee: Carnegie Mellon University, Pittsburgh, PA (US)

( * ) Notice: Subject to any disclaimer, the term of this patent is extended or adjusted under 35 U.S.C. 154(b) by 330 days.

(21) Appl. No.: 17/760,944

(22) PCT Filed: Sep. 16, 2020

(86) PCT No.: PCT/US2020/051069
§ 371 (c)(1),
(2) Date: Mar. 16, 2022

(87) PCT Pub. No.: WO2021/055475
PCT Pub. Date: Mar. 25, 2021

(65) Prior Publication Data
US 2022/0298650 A1     Sep. 22, 2022

Related U.S. Application Data

(60) Provisional application No. 62/973,098, filed on Sep. 16, 2019.

(51) Int. Cl.
C25B 9/63     (2021.01)
C25B 1/01     (2021.01)
(Continued)

(52) U.S. Cl.
CPC ............... *C25B 1/04* (2013.01); *C25B 1/01* (2021.01); *C25B 1/02* (2013.01); *C25B 1/50* (2021.01);
(Continued)

(58) Field of Classification Search
CPC ............... C25B 1/01; C25B 1/02; C25B 1/50
See application file for complete search history.

(56) References Cited

U.S. PATENT DOCUMENTS

| 6,299,743 B1 | 10/2001 | Oloman et al. |
| 2004/0052724 A1 | 3/2004 | Sorace |
| 2009/0095636 A1* | 4/2009 | Botte ..................... C25B 1/02 205/639 |

OTHER PUBLICATIONS

Buzzeo, M. et al "Elucidation of the Electrochemical Oxidation Pathway of Ammonia in Dimethyformamide and the Room Temperature Ionic Liquid, 1-Ethyl-3-methylimidazolium bis(trifluoromethylsulfonyl)imide" Electroanalysis, 2004, 16, 11, 888-896. (Year: 2004).*

(Continued)

*Primary Examiner* — Brian W Cohen
(74) *Attorney, Agent, or Firm* — KDW Firm PLLC

(57) ABSTRACT

In some aspects, the present disclosure pertains to methods for the electrochemical production of hydrogen in an electrochemical cell comprising an anode, a cathode and a liquid electrolyte comprising an ionic hydrogen carrier, wherein the electrochemical cell is operated under conditions such that hydrogen gas is produced from the ionic hydrogen carrier at the cathode and wherein nitrogen gas is produced from the ionic hydrogen carrier at the anode. Other aspects pertain to devices and systems for carrying out such methods.

13 Claims, 2 Drawing Sheets

(51) Int. Cl.
  *C25B 1/02*    (2006.01)
  *C25B 1/04*    (2021.01)
  *C25B 1/50*    (2021.01)
  *C25B 9/19*    (2021.01)
  *C25B 11/04*   (2021.01)
  *C25B 15/08*   (2006.01)

(52) U.S. Cl.
  CPC ................ *C25B 9/19* (2021.01); *C25B 9/63* (2021.01); *C25B 11/04* (2013.01); *C25B 15/08* (2013.01)

(56) References Cited

OTHER PUBLICATIONS

Schiffer, Z. et al "Nature of the First Electron Transfer in Electrochemical Ammonia Activation in a Nonaqueous Medium" J. Phys. Chem. C, 2019, 123, 9713-9720. (Year: 2019).*

Ji, X. et al "Mechanistic Studies of the Electro-oxidation Pathway of Ammonia in Several Room-Temperature Ionic Liquids" J. Phys. Chem. C, 2007, 111, 9562-9572. (Year: 2007).*

Aldous, L. et al "Clean, efficient electrolysis of formic acid via formation of eutectic, ionic mixture with ammonium formate" Energy Environ. Sci., 2010, 3, 1587-1592. (Year: 2010).*

Modisha et al., "Electrocatalytic Process for Ammonia Electrolysis: A Remediation Technique with Hydrogen Co-Generation" Int. J. Electrochem. Sci., 11 (2016) 6627-6635.

International Search Report and Written Opinion for the International Patent Application No. PCT/US2020/051069, mailed Dec. 9, 2020, 11 pages.

\* cited by examiner

IONIC LIQUID BASED MATERIALS AND CATALYSTS FOR HYDROGEN RELEASE

RELATED APPLICATIONS

This application is a national phase filing under 35 U.S.C. § 371 claiming the benefit of and priority to International Patent Application No. PCT/US2020/051069, filed Sep. 16, 2020, which claims the benefit of U.S. Provisional Patent Application No. 62/973,098, filed Sep. 16, 2019, the contents of which are incorporated herein in their entirety.

GOVERNMENT INTEREST

This invention was made with United States Government support under contract CBET1554273 awarded by the National Science Foundation. The U.S. government has certain rights in the invention.

BACKGROUND OF THE INVENTION

Hydrogen is a valuable commodity that is useful in various industries. For example hydrogen is used as a precursor to various products, including the manufacture of ammonia (which is useful, for example, in fertilizers, food and other products) and in the hydrogenation of carbon monoxide and various organic compounds. Hydrogen is also a valuable fuel source and can be, for example, reacted with oxygen (e.g., burned) to form water or converted to energy electrochemically (e.g., in a fuel cell). Hydrogen has a high energy content, providing three times more energy content per mass than conventional fuels such as gasoline, diesel and natural gas.

However, hydrogen has a low density per unit volume, making affordable, compact, bulk storage and transport of hydrogen a challenge. In this regard, hydrogen is currently transported and stored as either a compressed gas or a cryogenic liquid. Where transported and stored as a compressed gas, payloads in the range of 250 to 1,000=kilograms (kg) of hydrogen are commonly shipped in expensive containers with thick walls that are necessary to withstand pressures in the range of 200 to 500 bars. Where transported and stored as liquefied hydrogen, multi-layer vacuum insulated dewars are employed with payloads that can exceed 4,000 kg of hydrogen. However, hydrogen is energy intensive to liquefy.

It would be desirable to provide alternative sources of affordable, safe, and accessible hydrogen for use as fuel for power generation or in other applications. These and other challenges are addressed by the present disclosure.

SUMMARY OF THE INVENTION

The present disclosure is directed to hydrogen-rich ionic liquid or solid materials from which hydrogen can be liberated on-demand and to processes and systems for liberating hydrogen from such materials. The materials of the present disclosure are generally preferred to have one or more of the following properties: they are present in liquid form at ambient or moderate elevated temperatures (e.g., up to 200° C.), they have high hydrogen density, they have ambient temperature stability, they have ambient pressure stability, and hydrogen can be generated from the materials in an energy efficient fashion.

According to various aspects of the present disclosure, methods for the electrochemical production of hydrogen in an electrochemical cell are provided. In these aspects, the electrochemical cell may comprise an anode, a cathode and a liquid electrolyte comprising an ionic hydrogen carrier, and the electrochemical cell may be operated under conditions such that hydrogen gas is produced from the ionic hydrogen carrier at the cathode and such that nitrogen gas is produced from the ionic hydrogen carrier at the anode.

In some embodiments, which can be used with the above aspects, the ionic hydrogen carrier may comprise one or more anions selected from formate, acetate or nitrate anions.

In some embodiments, which can be used with the above aspects and embodiments, the ionic hydrogen carrier may comprise one or more cations selected from ammonium, hydrazinium, or alkylammonium anions.

In some embodiments, which can be used with the above aspects and embodiments, hydrogen and ammonia are produced from the ammonium cation at the cathode, or hydrogen and hydrazine are produced from the hydrazinium cation at the cathode, or hydrogen and alkyl amine are produced from alkylammonium cation at the cathode. In these embodiments, nitrogen gas may be produced from the ammonia at the anode, nitrogen gas may be produced from the hydrazine at the anode, or nitrogen gas may be produced from the alkylamine and water at the anode.

In some embodiments, which can be used with any of the above aspects and embodiments, nitrogen gas and water are produced from the nitrate anion at the cathode.

In some embodiments, which can be used with the above aspects and embodiments, carbon dioxide is produced at the anode.

In some embodiments, which can be used with the above aspects and embodiments, carbon dioxide gas is produced from formate anion at the anode, carbon dioxide gas is produced from acetate anion and water at the anode, or carbon dioxide gas is produced from alkyl amine and water at the anode.

In some embodiments, which can be used with the above aspects and embodiments, the electrolyte comprises an additive, for example, an additive selected from one or more of water, an alkylamine, an amide salt, or another proton acceptor, among others.

In some embodiments, which can be used with the above aspects and embodiments, ionic hydrogen carrier is a solid at room temperature (25° C.) and the liquid electrolyte is in the form of a melt that comprises the ionic hydrogen carrier and is formed at a temperature above room temperature.

In some embodiments, which can be used with the above aspects and embodiments, ionic hydrogen carrier is a liquid at room temperature (25° C.) or is liquid at temperature (25° C.) when combined with one or more suitable additives (e.g., where a eutectic mixture is formed).

In some embodiments, which can be used with the above aspects and embodiments, the cathode may comprise a catalyst, the anode may comprise a catalyst, or the cathode and the anode may both comprise a catalyst.

In some embodiments, which can be used with the above aspects and embodiments, the electrochemical cell may further comprise an ionically conductive separator that separates a cathode compartment containing the cathode and an anode compartment containing the anode.

In other aspects of the present disclosure, systems for the electrochemical production of hydrogen are provided. The systems comprise an electrochemical cell comprising an anode, a cathode and a liquid electrolyte comprising an ionic hydrogen carrier. Moreover, the systems are configured to operate the electrochemical cell under conditions such that hydrogen gas is produced from the ionic hydrogen carrier at the cathode and nitrogen gas is produced from the ionic hydrogen carrier at the anode, for example, in accordance with any of the above aspects or embodiments.

In some embodiments, which can be used with the above aspects and embodiments, the system may comprise a feeder that this configured to continuously introduce the ionic hydrogen carrier into the electrolyte.

In some embodiments, which can be used with the above aspects and embodiments, the system is configured to capture gases that are produced at the anode and/or the cathode.

In some embodiments, which can be used with the above aspects and embodiments, the cathode for the system comprises a catalyst, the anode for the system comprises a catalyst, or the cathode and the anode for the system both comprise a catalyst. For example, the catalyst may comprise a platinum group metal, among others.

In some embodiments, which can be used with the above aspects and embodiments, the system further comprises an ionically conductive separator that separates a cathode compartment containing the cathode and an anode compartment containing the anode.

DETAILED DESCRIPTION

Figure 1:
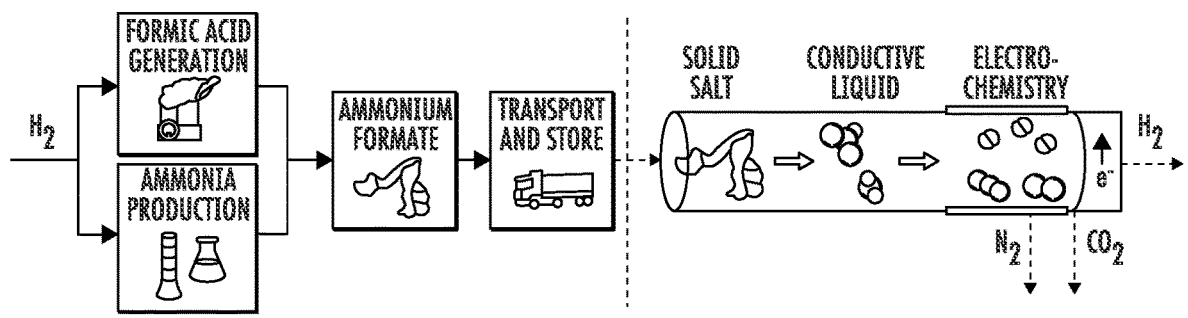
FIG. 1 is a schematic of a system in which hydrogen is used to form ammonia and formic acid, which are then converted to ammonium formate, which is then converted to hydrogen, nitrogen, and carbon dioxide via electrochemical reactions.

According to an aspect of the present disclosure, methods are provided for the electrochemical production of hydrogen in an electrochemical cell. In various embodiments, the electrochemical cell includes an anode, a cathode and a liquid electrolyte comprising an ionic hydrogen carrier. The electrochemical cell is operated under conditions such that hydrogen gas is produced from the ionic hydrogen carrier at the cathode. Moreover, nitrogen gas is preferably produced from the ionic hydrogen carrier at the anode. In certain cases, nitrogen gas is further produced from the ionic hydrogen carrier at the cathode. In certain cases, carbon dioxide is produced from the ionic hydrogen carrier at the cathode.

In some embodiments, the ionic hydrogen carrier is a solid at room temperature (25° C.) and the liquid electrolyte comprises a melt of the ionic hydrogen carrier that is formed at a temperature above room temperature (e.g., at a temperature ranging from 25° C. to 200° C. or more, for example, ranging from 25° C. to 50° C. to 75° C. to 100° C. to 125° C. to 150° C. to 175° C. to 200° C. or more (in other words, ranging between any two of the preceding values).

In some embodiments, the ionic hydrogen carrier is a liquid at room temperature (25° C.) and the liquid electrolyte comprises a melt of the ionic hydrogen carrier with a mixture of ionic liquids with or without additives that is formed at a temperature that is at or below room temperature (e.g., at a temperature ranging from −50° C. to 25° C. or more, for example, ranging from 25° C. to 0° C. to −25° C. or less (in other words, ranging between any two of the preceding values).

In various embodiments, the ionic hydrogen carrier serves as both the fuel for the electrochemical cell and all or a majority of the overall electrolyte for the electrochemical cell. In liquid form, ionic hydrogen carriers like those described herein are naturally highly conductive and do not release volatile solvents.

The electrolyte may contain any amount of ionic hydrogen carrier up to 100% of the ionic hydrogen carrier. In various embodiments, the electrolyte may contain from 50 wt % or less up to 100 wt % of the ionic hydrogen carrier), for example, containing from 50 wt % to 75 wt % to 80 wt % 90 wt % to 95 wt % to 97.5 wt % to 99 wt % to 99.5 wt % to 99.9 wt % to 100 wt % of the ionic hydrogen carrier.

In various embodiment the ionic hydrogen carrier comprises one or more anions selected from formate, acetate or nitrate anions.

In various embodiment the ionic hydrogen carrier comprises one or more cations selected from ammonium, hydrazinium, or alkylammonium (e.g., methylammonium, ethylammonium, n-propylammonium, isopropylammonium, etc.) cations. More generally, the alkylammonium cations are represented by $NR_nH_{4-n}^+$, where n=0, 1, 2, 3 or 4 and $R=C_iH_{(2i+1)}$, where i is a positive integer (e.g., i=0, 1, 2, 3, 4, 5, 6, etc.). When n>1, the R groups in the hydrogen carrier can be the same or dissimilar (i.e., having a different value for i in $C_iH_{(2i+1)}$).

Particular examples of such salts (along with published melting points, where available) include the following among others: ammonium formate (116° C.), ammonium acetate (113° C.), ammonium nitrate (170° C.), hydrazinium formate, hydrazinium acetate (100-102° C.), hydrazinium nitrate (72° C.), methylammonium formate (116° C.), methylammonium acetate (75° C.), methylammonium nitrate (101° C.), ethylammonium formate (73° C.), ethylammonium acetate (12° C.), ethylammonium nitrate (12° C.).

Predicted cathodic and anodic reactions are provided below for these compounds. These reactions are based on a generic base/proton carrier "B" that can be protonated to form "BH+". In practice, the proton carrier and protonated form can correspond to ammonia and ammonium, respectively, any of the proton-accepting anions, or another proton accepting species. Water ($H_2O$) may also be included as a reactant or product as necessary to balance out required oxygen atoms. Additionally, only nitrate reduction to dinitrogen gas is shown in the equations below. However, nitrate can also be reduced to ammonia in all cases. For alkylammonium cations, total oxidation to carbon dioxide gas is assumed. Additional reactions that only involve partial oxidation to smaller hydrocarbons etc. are not shown but are theoretically possible.

Where the anion and cation are formate and ammonium, respectively, predicted reactions at the anode and cathode are as follows:

At Cathode:

$$NH_4^+ + e^- \rightarrow NH_3 + \tfrac{1}{2}H_2$$

At Anode:

$$NH_3 + 3B \rightarrow 3BH^+ + \tfrac{1}{2}N_2 + 3e^-$$

$$HCO_2^- + B \rightarrow CO_2 + BH^+ + 2e^-$$

Where the anion and cation are acetate and ammonium, respectively, predicted reactions at the anode and cathode are as follows:

At Cathode:

$$NH_4^+ + e^- \rightarrow NH_3 + \tfrac{1}{2}H_2$$

At Anode:

$$NH_3 + 3B \rightarrow 3B^+ + \tfrac{1}{2}N_2 + 3e^-$$

$$CH_3CO_2^- + 7B + 2H_2O \rightarrow 2CO_2 + 7BH^+ + 7e^-$$

Where the anion and cation are nitrate and ammonium, respectively, predicted reactions at the anode and cathode are as follows:

At Cathode:

$$NH_4^+ + e^- \rightarrow NH_3 + \tfrac{1}{2}H_2$$

$$NO_3^- + 3BH^+ + 8e^- \rightarrow 9B + 3H_2O + \tfrac{1}{2}N_2$$

At Anode:

$$NH_3 + 3B \rightarrow 3BH^+ + \tfrac{1}{2}N_2 + 3e^-$$

Where the anion and cation are formate and hydrazinium, respectively, predicted reactions at the anode and cathode are as follows:

At Cathode:

$$N_2H_5^+ + e^- \rightarrow N_2H_4 + \tfrac{1}{2}H_2$$

At Anode:

$$N_2H_4 + 4B \rightarrow 4BH^+ + N_2 + 4e^-$$

$$HCO_2^- + B \rightarrow CO_2 + BH^+ + 2e^-$$

Where the anion and cation are acetate and hydrazinium, respectively, predicted reactions at the anode and cathode are as follows:

At Cathode:

$$N_2H_5^+ + e^- \rightarrow N_2H_4 + \tfrac{1}{2}H_2$$

At Anode:

$$N_2H_4 + 4B \rightarrow 4BH^+ + N_2 + 4e^-$$

$$CH_3CO_2^- + 7B + 2H_2O \rightarrow 2CO_2 + 7BH^+ + 7e^-$$

Where the anion and cation are nitrate and hydrazinium, respectively, predicted reactions at the anode and cathode are as follows:

At Cathode:

$$N_2H_5^+ + e^- \rightarrow N_2H_4 + \tfrac{1}{2}H_2$$

$$NO_2^- + 9BH^+ + 8e^- \rightarrow 9B + 2H_2O + \tfrac{1}{2}N_2$$

At Anode:

$$N_2H_4 + 4B \rightarrow 4BH^+ + N_2 + 4e^-$$

Where the anion and cation are formate and alkyl ammonium, respectively, predicted reactions at the anode and cathode are as follows:

At Cathode:

$$C_xH_yNH^+ + e^- \rightarrow C_xH_yN + \tfrac{1}{2}H_2$$

At Anode:

$$C_xH_yN + 2xH_2O + (4x+y)B \rightarrow xCO_2 + (4x+y)BH^+ + \tfrac{1}{2}N_2 + 3e^-$$

$$HCO_2^- + B \rightarrow CO_2 + BH^+ + 2e^-$$

Where the anion and cation are acetate and alkyl ammonium, respectively, predicted reactions at the anode and cathode are as follows:

At Cathode:

$$C_xH_yNH^+ + e^- \rightarrow C_xH_yN + \tfrac{1}{2}H_2$$

At Anode:

$$C_xH_yN + 2xH_2O + (4x+y)B \rightarrow xCO_2 + (4x+y)BH^+ + \tfrac{1}{2}N_2 + 3e^-$$

$$CH_3CO_2^- + 7B + 2H_2O \rightarrow 2CO_2 + 7BH^+ + 7e^-$$

Where the anion and cation are nitrate and alkyl ammonium, respectively, predicted reactions at the anode and cathode are as follows:

At Cathode:

$$C_xH_yNH^+ + e^- \rightarrow C_xH_yN + \tfrac{1}{2}H_2$$

$$NO_3^- + 9BH^+ + 8e^- \rightarrow 9B + 3H_2O + \tfrac{1}{2}N_2$$

At Anode:

$$C_xH_yN + 2xH_2O + (4x+y)B \rightarrow xCO_2 + (4x+y)BH^+ + \tfrac{1}{2}N_2 + 3e^-$$

As noted above, hydrogen gas is produced from the ionic hydrogen carrier at the cathode. For example, as seen from the above reactions, hydrogen and ammonia may be produced from ammonium cation at the cathode, hydrogen and hydrazine may be produced from hydrazinium cation at the cathode, and hydrogen and alkyl amine may be produced from alkylammonium cation at the cathode.

Moreover, in certain cases, nitrogen gas may be produced from the ionic hydrogen carrier at the cathode. For example, as seen from the above reactions, nitrogen gas and water may be produced from the nitrate anion at the cathode.

As also noted above, nitrogen gas may be produced from the ionic hydrogen carrier at the anode. For example, as seen from the above reactions, nitrogen gas may be produced from ammonia at the anode, nitrogen gas may be produced from hydrazine at the anode, or nitrogen gas (along with carbon dioxide gas) may be produced from alkylamine and water at the anode.

Moreover, in certain cases, carbon dioxide may be produced at the anode. For example, as seen from the above reactions, carbon dioxide gas may be produced from formate anion at the anode, carbon dioxide gas may be produced from acetate and water at the anode, and carbon dioxide gas (along with nitrogen gas) may be produced from alkylamine and water at the anode.

As previously noted, the above reactions are based on a generic base/proton acceptor "B" that can be protonated to form "BH+", which, in practice, can correspond to ammonia and ammonium, respectively, any of the proton-accepting anions, or any proton-accepting additive. Possible additives include alkylamines, water, and amide salts. It is expected that alkylamines may be better proton accepters than ammonia, and that the addition of an alkylamines will deprotonate an ammonium cation to form an alkylammonium cation and an ammonia molecule. In the case of ammonium formate, this essentially would create a mixture of, e.g., alkylammonium formate and ammonium formate. In the case where the alkylammonium formate is a liquid at room temperature, mixtures of the two salts may result in a decreased melting point. Similarly, it is expected that the addition of an amide salt will result in deprotonation of the ammonium ion and the formation of a formate salt along with two stoichiometric equivalents of ammonia, and that the mixture of the ammonium formate and the new formate salt may form a eutectic that would lower the melting point. Lastly, water can be used as an additive. In the case of ammonium formate, it is noted that ammonium formate is very soluble in water (>100 g ammonium formate can dissolve in 100 g water at room temperature), so additions of small amounts of water to the electrolyte may help dissolve the ammonium formate and make a water-lean mixture that has a lower melting point.

As seen from the above, in addition to an ionic hydrogen carrier, the electrolyte may further comprise one or more additives such as water, an alkylamine, an amide salt, another proton acceptor, or combinations thereof, among others. Where an additive is present, the electrolyte may contain, for instance, from 0.1 wt % or less to 50 wt % or more of one or more additives, for example, the electrolyte may contain from 0.1 wt % to 0.5 wt % to 1 wt % to 2.5 wt % to 5 wt % to 10 wt % to 25 wt % to 50% of the one or more additives. As also indicated above, additives may form eutectic mixtures with the ionic hydrogen carrier, thereby lowering the melting point of an electrolyte containing the ionic hydrogen carrier and the additive.

In various embodiments, a catalyst may be provided at the cathode in order to reduce the overpotentials of the reduction reaction(s) that is(are) occurring at the cathode. Similarly, in various embodiments, a catalyst may be provided at the anode in order to reduce the overpotentials of the oxidation reaction(s) that is(are) occurring at the anode. In certain of these embodiments, the cathode and/or anode catalysts may comprise a transition metal catalyst, for example, a platinum group catalyst such as gold, platinum or palladium, among others. Other potential catalysts include metal oxides, metal nitrides, and nitride MXenes, among others.

In various embodiments, the electrochemical cells of the present disclosure may include a ionically conductive separator which allows for ionic conductivity between the electrolyte on the cathodic and the anodic sides of the cell, while at the same time preventing large scale convective mixing of the electrolyte. For example, a separator made of porous glass or polypropylene may be included for this purpose.

Although clearly applicable to a number ionic hydrogen carriers, further aspects of the present disclosure will now be discussed in conjunction with the use of ammonium formate as a particular ionic hydrogen carrier.

Ammonium formate combines two well-known hydrogen carriers, ammonia and formic acid, to form an ionic hydrogen carrier that takes advantage of the most favorable qualities of both. In this regard, ammonia is an appealing hydrogen carrier because of its high hydrogen content: reported as 110 kg $H_2/m^3$ for liquid ammonia compared to 71 kg $H_2/m^3$ for liquid hydrogen at 1 bar and 20 Kelvin and 40 kg $H_2/m^3$ for compressed hydrogen at 700 bar and 288 K. The disadvantages of ammonia as a hydrogen carrier are its safety, since it is extremely caustic and corrosive. Moreover, current processes to release hydrogen from ammonia involve high temperature thermal cracking and are inefficient. Formic acid has been proposed as a hydrogen carrier because of its hydrogen content (having a reported content of 53 kg $H_2/m^3$) and its ease of transport and storage since it is a liquid. Current processes to release hydrogen from formic acid, however, are not efficient. Metallic formate salts, such as potassium formate, are easy to transport since they are solid, but they have a relatively low hydrogen content (having a reported content of 23 kg $H_2/m^3$). Ammonium formate can be spontaneously generated by combining ammonia with formic acid, and it melts at 116° C. Ammonium formate contains a reported 101 kg $H_2/m^3$, similar to liquid ammonia and twice that of compressed hydrogen gas or formic acid. Ammonium formate is also a solid at ambient conditions, making it easy to transport without the safety concerns present while transporting caustic and corrosive chemicals such as ammonia or formic acid.

The overall reaction for the conversion of ammonium formate to nitrogen, hydrogen and carbon dioxide gases is shown here:

$$2NH_4^+HCO_2^-(s) \rightarrow N_2(g)+5H_2(g)+2CO_2(g)$$

This reaction has a standard potential of 0.04 V (see E. H. Oelkers et al., J. Phys. Chem. Ref. Data. 24 (1995), pp. 1401-1560) and thus theoretically requires a small applied potential to convert the salt to hydrogen and other gaseous constituents.

A schematic diagram illustrating the above described system is shown in FIG. 1. In particular, a safe, easily transported solid, specifically ammonium formate here, can be synthesized using existing processes (left of vertical line). This salt is then fed into an electrochemical reactor (right of the vertical line) where the salt becomes a conductive liquid through increased temperature or combination with additives that lower the melting point. The salt is then converted to hydrogen, nitrogen, and carbon dioxide via electrochemical reactions.

Cathodic and anodic reactions for this conversion are:
Cathode:

$$NH_4^+ + e^- \rightarrow NH_3 + \tfrac{1}{2}H_2$$

Anode:

$$4NH_3 \rightarrow 3NH_4^+ + \tfrac{1}{2}N_2 + 3e^-$$

$$HCO^- + NH_3 \rightarrow CO_2 + NH_4^+ + 2e^-$$

As seen from these reactions, the anode reaction for the conversion of ammonium formate is believed be based on the oxidation of ammonia, rather than ammonium. Accordingly, ammonia is required to be transported from the cathode, where it is produced to the anode where it is consumed. This may be addressed by the addition of a proton carrier, such as water or an amine as discussed above, and/or by careful cell design to control gas flow. Additionally, electrochemical cell is configured to provide for the removal of hydrogen, nitrogen, and carbon dioxide gases. The electrochemical cell is also configured to provide for the addition of ammonium formate as it is converted into hydrogen, nitrogen, and carbon dioxide gases. For example, an electrochemical cell in which a 100 $cm^2$ electrode operating at 100 $mA/cm^2$ would produce ~4.2 L of $H_2$ per hour at standard temperature and pressure and would require an input feed of ~4.7 g of ammonium formate per hour.

Figure 2:
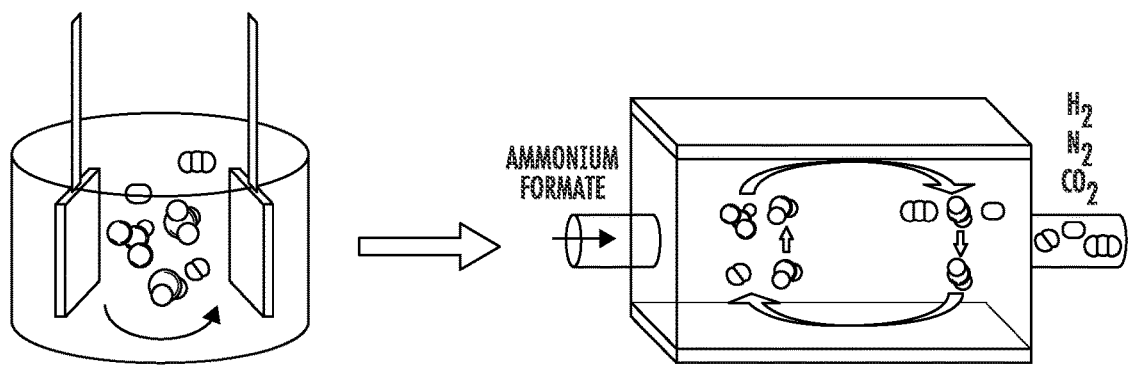
FIG. 2 is a schematic showing both a simple experimental setup (i.e., a beaker cell, left) and a more advanced flow-cell (right) with managed transport in which transport of reactants and removal of products is optimized.

In this regard, FIG. 2 is a schematic illustration showing a simple experimental setup (i.e., a beaker cell, left) in which all reactants and products are mixed in the electrolyte, which may be scaled up to a more advanced flow-cell (right) with managed transport in which transport of reactants (for, e.g., ammonium ion, formate ion and ammonia) and removal of products is optimized.

While ammonium formate relies on oxidation of ammonia to nitrogen and formate to carbon dioxide, other cations and anions can also produce benign products. Such systems include those described above. For example, hydrazinium formate has a high hydrogen content, is molten below 100° C., and exhibits one of the highest reported conductivities for any protic ionic liquid. See, e.g., C. A. Angell et al., Acc. Chem. Res. 40, 1228-1236 (2007). Hydrazinium monoformate likely would be more expensive than ammonium formate to produce but is likely easier to convert electrochemically to nitrogen (see L. Aldous, R. G. Compton, ChemPhysChem. 4, 1280-1287 (2011)).

Example 1

Figure 3:
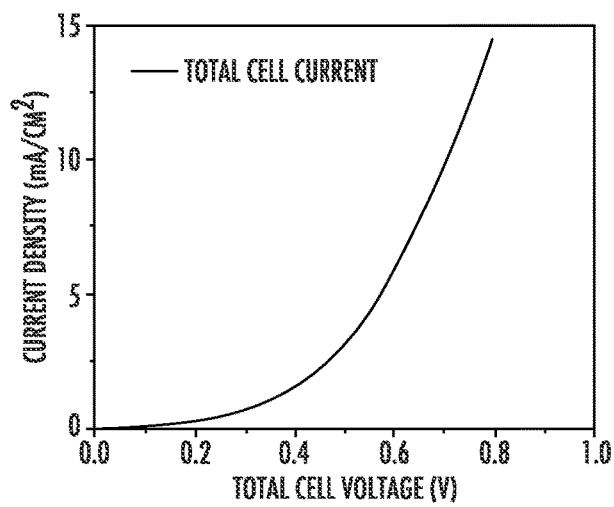
FIG. 3 is a linear sweep voltammetry diagram at 5 m V/s of ammonium formate at its melting temperature.

An electrochemical cell has been constructed and has validated the use of ammonium formate as a hydrogen carrier. Using platinum foil anodes in a round-bottom flask, ammonium formate was kept just above its melting point for these electrochemical experiments. A linear potential sweep of the system demonstrates that the system is electrochemically active (FIG. 3). The predicted open circuit potential is 0.04 V, and currents of 10 mA/cm2 are achievable at a potential of 1V, which is remarkable for an unoptimized cell. Product analysis via gas chromatography reveals that the only two products are hydrogen gas and carbon dioxide, confirming the high selectivity of the reaction. At this stage, only hydrogen gas and carbon dioxide are expected since the system is composed primarily of ammonium cations and likely very little ammonia molecules.

Example 2

Figure 4:
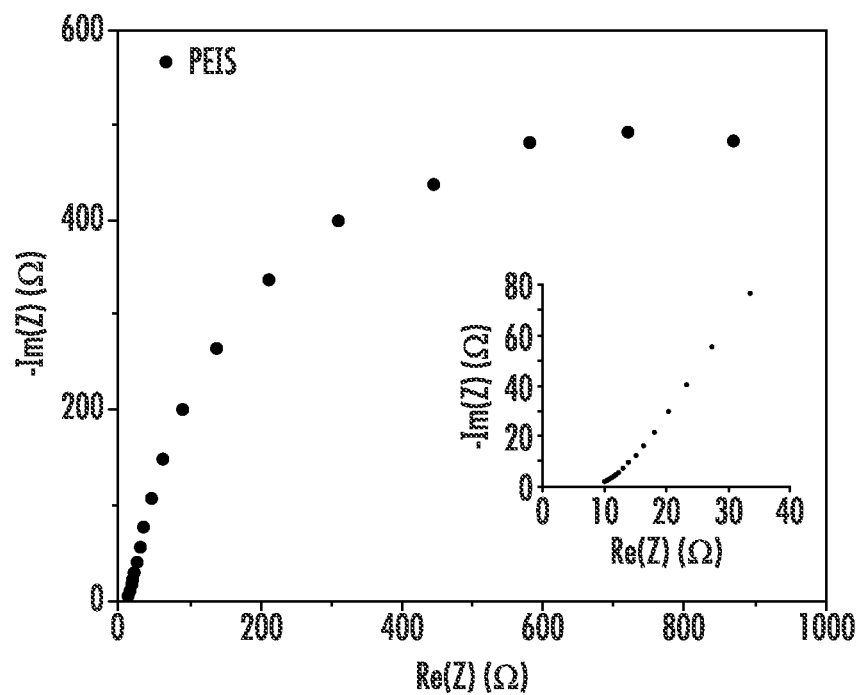
FIG. 4 is an impedance spectroscopy diagram of ammonium formate at electrochemical operating conditions.

To select ionic liquids, it is desirable to first quantify their physical properties. Two important parameters are the conductivity and the melting point. High conductivities ensure that resistive losses are minimized at high currents and low melting points are desirable for optimal energy efficiency as well as ease of use. Using impedance spectroscopy and the cell geometry, one can determine the conductivity of the ionic liquid. FIG. 4 an impedance spectroscopy plot of liquid ammonium formate (ammonium formate melt) at electrochemical operating conditions and reveals the ionic hydrogen carrier's resistance (x-axis intercept). A high conductivity of 0.1-1 S/cm was measured, which reflects the unique ability of the fuels proposed herein to act as ionic conductors. Since ionic liquids are intrinsically conductive, supporting salts are unnecessary, opening the possibility of having an electrolyte the consist of only of the ionic hydrogen carrier. In addition, ammonium formate was characterized using differential scanning calorimetry, which reveals a compound's melting point as well as it decomposition point. These define the temperature window in which the electrochemical cell will be operated. Unsurprisingly, ammonium formate was found to melt at ~120° C.

Example 3

Figure 5:
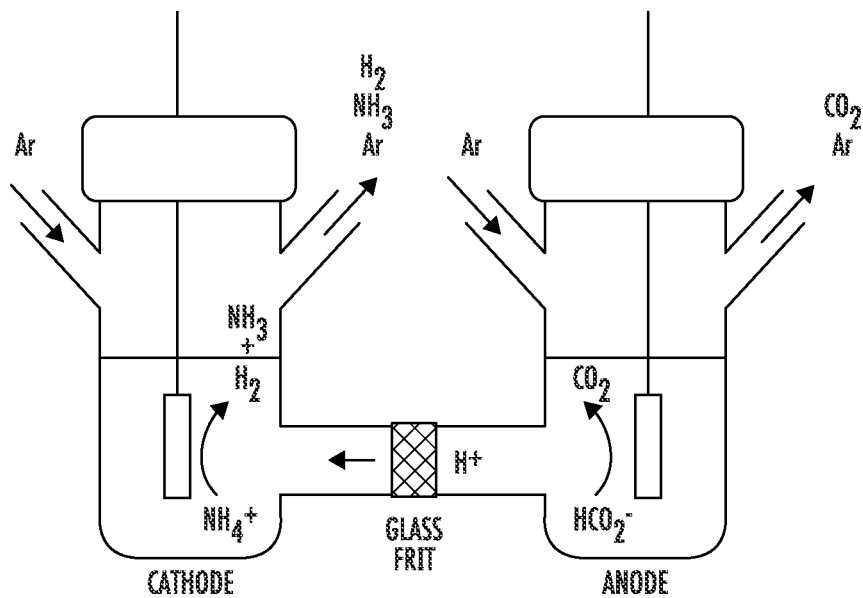
FIG. 5 is a schematic depiction of custom-built H-Cell for electrochemical testing of ionic liquid electrochemical fuels. Example reactions, inlet, and outlet gases are shown for the case where ammonium formate is used as the electrolyte.

All electrochemical tests were conducted using a custom-built H-cell with anode and cathode compartments separated by a glass frit. A schematic of the H-cell with example reactions is shown in FIG. 5. Additional ports on the sides of each compartment allow for gas inlet and outlet, enabling online gas chromatography for product analysis. In general, platinum or gold foils were used as both anodic and cathodic electrodes. In a typical experiment, each compartment of the H-Cell was partially filled with solid ammonium formate. The cell was then placed in an oil bath and heated to ~116° C. (until the ammonium formate melted). Small stir bars were used in each compartment to keep the liquid ammonium formate electrolyte well-mixed.

Impedance spectroscopy was used to analyze the electrolyte resistance, confirming that the liquid ammonium formate was intrinsically conductive and that the system conductivity was comparable to that of similar alkylammonium ionic liquids. Linear sweep voltammetry and cyclic voltammetry demonstrated that the system was electrochemically active. In particular, cyclic voltammetry and linear sweep voltammetry verified that the system was electrochemically active with gold and platinum foils used in all combinations as anodes and cathodes.

Under polarization, argon gas was flowed into a compartment and effluent gas was flowed into a gas chromatograph where hydrogen, carbon monoxide, and carbon dioxide were quantified. Tests at constant applied current with platinum electrodes were conducted to quantify products. The cathode achieved a Faradaic efficiency of ~100% toward hydrogen gas and the anode achieved a Faradaic efficiency of ~80% toward carbon dioxide at applied currents ranging from 1 $mA/cm^2$ to 6 $mA/cm^2$. In addition, effluent streams were bubbled through a boric acid trap, and the trap was analyzed via nuclear magnetic resonance (NMR) for dissolved species. Formate/formic acid was observed via NMR in the acid trap, suggesting the presence of formic acid in the electrolyte. A colorimetric assay using the salicylate method confirmed the presence of ammonia in the acid trap as well.

These results suggest that the ammonium cations are reduced to generate hydrogen gas and ammonia at the cathode. Due to the temperature (~116° C.), the ammonia likely boils off and is caught in the acid trap. At the anode, formate is most likely oxidized to carbon dioxide, with additional formate anions also being the proton acceptor since the other major species, ammonium, cannot accept protons. Protonated formate, or formic acid, can also be a vapor at these temperatures, explaining its presence in the acid trap. Thus, at these conditions, ammonium formate is likely decomposing into hydrogen, carbon dioxide, and ammonia. With the addition of other additives and proton acceptors (e.g., water or alkylamines), operating temperature may be lowered and a system may be constructed such that ammonia would be present at the anode for oxidation to nitrogen gas.

Examples of implementations of the invention described herein are for purposes of illustration only and are not to be taken as limiting the scope of the invention in any way. The scope of the invention is set forth in the following claims.

We claim:

1. A method for the electrochemical production of hydrogen in an electrochemical cell comprising:
   an anode;
   a cathode; and
   a liquid electrolyte comprising an ionic hydrogen carrier;
   wherein the electrochemical cell is operated under conditions such that hydrogen gas is produced from the ionic hydrogen carrier at the cathode;
   wherein nitrogen gas is produced from the ionic hydrogen carrier at the anode; and
   wherein the electrolyte comprises at least 90 wt % of the ionic hydrogen carrier.

2. The method of claim 1, wherein the ionic hydrogen carrier comprises one or more anions selected from formate, acetate or nitrate anions.

3. The method of any of claims 1-2, wherein the ionic hydrogen carrier comprises one or more cations selected from ammonium, hydrazinium, or alkylammonium anions.

4. The method of claim 3, wherein hydrogen and ammonia are produced from the ammonium cation at the cathode, wherein hydrogen and hydrazine are produced from the hydrazinium cation at the cathode, or wherein hydrogen and alkyl amine are produced from alkylammonium cation at the cathode.

5. The method of claim 4, wherein nitrogen gas is produced from the ammonia at the anode, wherein nitrogen gas is produced from the hydrazine at the anode, or wherein nitrogen gas is produced from the alkylamine and water at the anode.

6. The method of claim 1, wherein nitrogen gas and water are produced from the nitrate anion at the cathode.

7. The method of claim 1, wherein carbon dioxide is produced at the anode.

8. The method of claim 1, wherein carbon dioxide gas is produced from formate anion at the anode, carbon dioxide gas is produced from acetate anion and water at the anode, or wherein carbon dioxide gas is produced from alkyl amine and water at the anode.

9. The method of claim 1, wherein the ionic hydrogen carrier is a solid at room temperature (25° C.) and the liquid electrolyte is in the form of a melt that comprises the ionic hydrogen carrier and is formed at a temperature above room temperature, wherein the ionic hydrogen carrier is a liquid at room temperature (25° C.), or wherein the ionic hydrogen carrier is a liquid at temperature (25° C.) when combined with one or more additives.

10. The method of claim 1, wherein the electrolyte comprises an additive.

11. The method of claim 1, wherein the electrolyte comprises up to 10 wt % of an additive.

12. The method of claim 1, wherein the cathode comprises a catalyst, wherein the anode comprises a catalyst, or wherein the cathode and the anode both comprise a catalyst.

13. The method of claim 1, wherein the electrochemical cell further comprises an ionically conductive separator that separates a cathode compartment containing the cathode and an anode compartment containing the anode.

* * * * *